May 18, 1965  H. G. OLSON  3,184,022
FLUID CLUTCH WITH RETRACTABLE VANES
Filed May 14, 1962  2 Sheets-Sheet 1
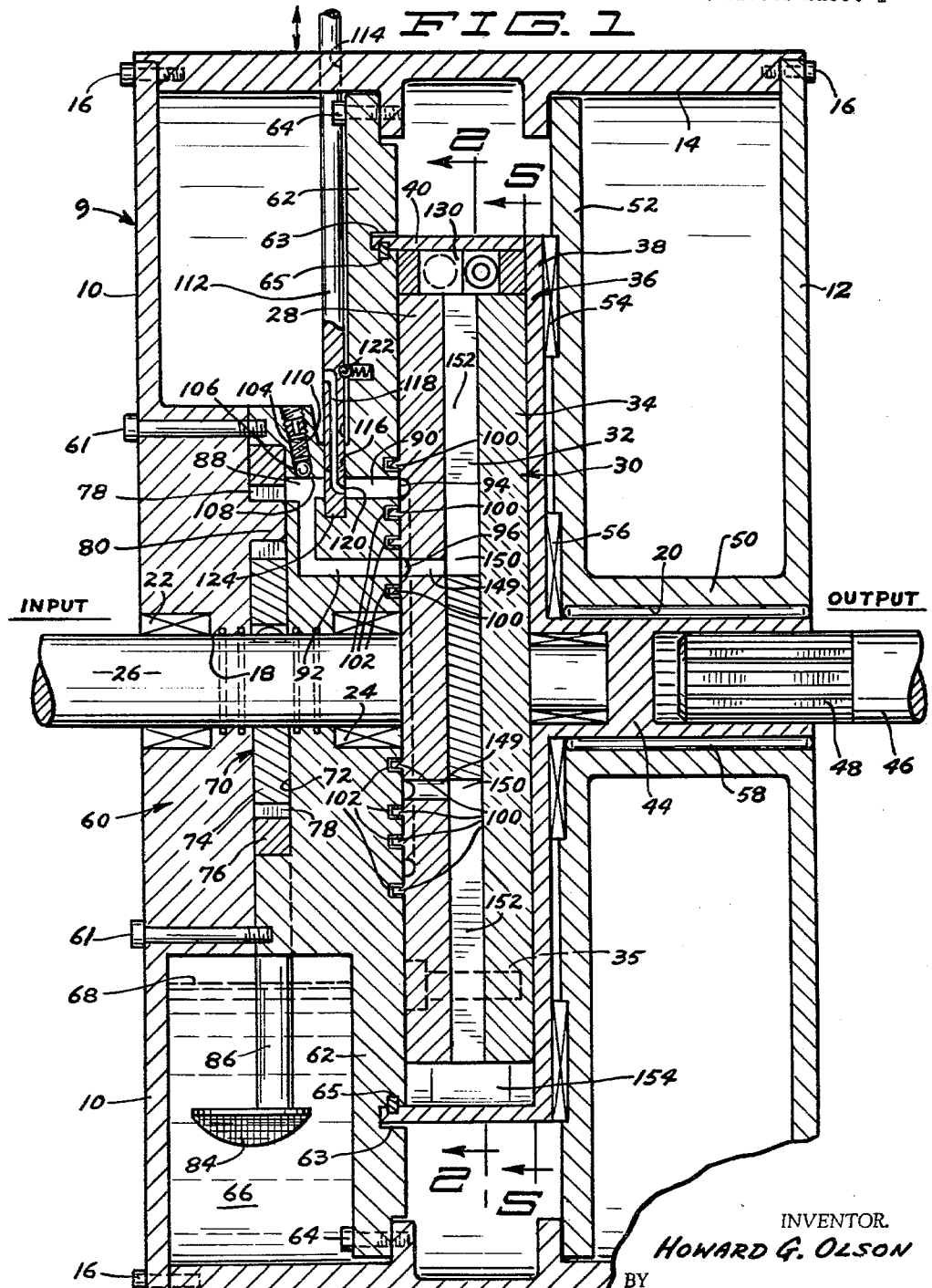
INVENTOR.
HOWARD G. OLSON
BY
Carlsen and Carlsen
ATTORNEYS

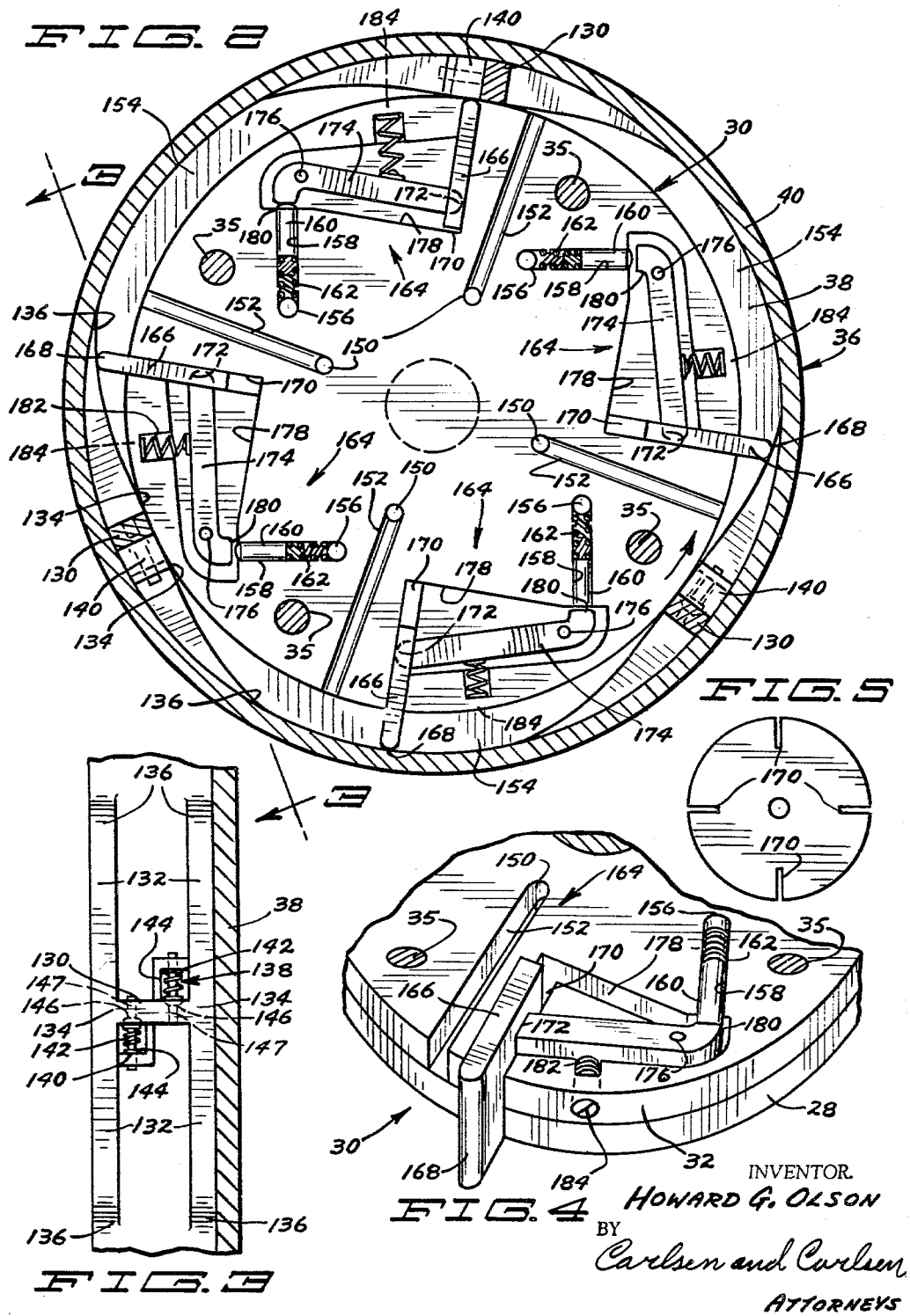

United States Patent Office 3,184,022
Patented May 18, 1965

3,184,022
FLUID CLUTCH WITH RETRACTABLE VANES
Howard G. Olson, Box 204, East Glacier Park, Mont.
Filed May 14, 1962, Ser. No. 194,564
8 Claims. (Cl. 192—58)

The present invention relates to motive power transmitting devices and more particularly to hydraulic couplings.

While many hydraulic coupling devices have been previously proposed, most of them are relatively complicated in construction and consequently expensive to manufacture. Others, while they are relatively low in cost, are at least to some extent ineffective in operation. In many of these devices a substantial amount of slippage will take place when the output shaft is running at full speed. Other hydraulic couplings do not engage smoothly and in still others engagement between input and output shafts must be controlled by a separate device or by an operator.

It is thus one object of the present invention to provide an improved hydraulic coupling wherein slippage between the input and output shafts is eliminated at normal driving speeds.

It is another object of the present invention to provide an improved hydraulic coupling characterized by a smooth engagement between an input and output shaft as the power is applied to the input shaft.

It is yet another object of the present invention to provide an improved hydraulic coupling wherein the engagement between the output and input shafts is controlled automatically in response to the speed of the input shaft.

It is still another object of the present invention to provide an improved hydraulic coupling wherein the output shaft can be disengaged from the input shaft during any stage of the operation.

It is yet another object of the present invention to provide an improved hydraulic coupling of the type described having a rotor with radially movable circumferentially spaced apart vanes and a means for controlling the positioning of the vanes so that the vanes can be rendered inoperative at any stage of operation to thereby disengage the input and output shafts.

These and other more detailed and specific objects will be disclosed in the course of the following specification, reference being had to the accompanying drawings, in which—

FIG. 1 is a vertical longitudinal sectional view through the center of the apparatus.

FIG. 2 is a vertical transverse sectional view taken on line 2—2 of FIG. 1.

FIG. 3 is a sectional view taken on line 3—3 of FIG. 2.

FIG. 4 is a partial perspective view of a portion of the rotor with one rotor plate removed.

FIG. 5 is an end elevational view of the rotor taken on line 5—5 of FIG. 1.

Briefly stated, the present invention provides a hydraulic coupling having input and output shafts with a rotor connected to one shaft and a reactor connected to the other shaft and at least partially enclosing the rotor. At least two circumferentially spaced apart radially movable sealing vanes are mounted upon the rotor. The outward wall of the rotor is spaced from the wall of the reactor to define a fluid reaction chamber therebetween but at least one portion of the reactor wall is positioned in sealing relationship with the outward wall of the rotor thereby dividing the reaction chamber into at least two compartments. Means are also provided for permitting a predetermined flow of hydraulic fluid from one compartment to another for controlling engagement between the rotor and the reactor.

Referring now to the drawings, there is shown a hydraulic coupling including a hollow housing 9 having end walls 10 and 12 and a cylindrical side wall 14. The end walls 10 and 12 can be secured to the side wall 14 by suitable fasteners such as bolts 16. The end walls 10 and 12 are provided with central coaxial bores 18 and 20 respectively. Within the bore 18 is provided a friction reducing bearing 22 of a suitable known construction. Within the bearing 22 is mounted an input shaft 26, the inward end of which is rigidly secured to an end plate 28 of a rotor indicated generally at 30.

The rotor 30 also includes a center plate 32 and an end plate 34. The plates 28, 32 and 34 are rigidly secured together for rotation as a unit by means of suitable fasteners such as bolts 35. The rotor 30 is rotatably mounted within a casing or reactor 36 having an end wall 38 and a generally cylindrical side wall 40. The end wall 38 includes an outwardly extending coupling member 44 to which an output shaft 46 is secured by means of a splined connection 48. The extension 44 is suitably rotatably mounted within a sleeve 50 which projects inwardly from the end wall 12. Extending normal to the inward end of the sleeve 50 is a mounting plate 52. Suitable friction reducing bearings can be provided between the mounting plate 52 and the casing 36 at 54 and 56. Friction reducing bearings can also be provided at 58 between the sleeve 50 and the extension 44.

The end wall 10 includes a central hub portion 60 within which the bearing 22 is placed. Suitably connected to the inward end of the hub 60 as by bolts 61 is a mounting plate 62 within which is secured a friction reducing bearing 24. The mounting plate 62 is secured at its periphery to the side wall 14 by suitable fasteners such as bolts 64. The free end of the side wall 40 projects into a circular recess 63 provided in the inward side of the mounting plate 62 as best seen in FIG. 1. A suitable sealing member is slidably mounted between the inward surface of the side wall 40 and the groove 65. A space is provided within the housing 9 between the end wall 10 and mounting plate 62 to define a fluid supply reservoir 66 within which hydraulic fluid 68 is stored.

Between the mounting plate 62 and hub 60 is provided a means for supplying hydraulic fluid under pressure such as a hydraulic pump 70 of suitable known construction. The side walls and one end wall of the pump 70 are defined by a circular recess 72 in the outward wall of the mounting member 62 and the opposite wall thereof is defined by the inward surface of hub 60. While any suitable type of pump can be employed, the pump can, if desired, comprise of a gear pump composed of a gear 74 rigidly mounted upon shaft 26 and a ring gear 76 having internal teeth 78 which mesh with the teeth of the gear 74 at the lower end of the pump but are separated from the teeth of gear 74 at the upper end of the pump by a spacer member 80 which projects from the inward wall of the hub 60.

During operation, the hydraulic fluid 68 is drawn by pump 70 from the storage reservoir 66 through a suitable filter element 84, a duct 86 and into the pump 70. Fluid leaves the pump 70 through a pump outlet port 88 which communicates through ducts 90 and 92 with a pair of concentric circular grooves 94 and 96 respectively in the outward face of the plate 28, as will be more fully described hereinbelow.

As best seen in FIG. 1 the outward wall of the rotor plate 28 is provided with a plurality of concentric spaced apart sealing rings 100. Each of these rings project into one of a plurality of circular concentric recesses 102 within the inward wall of the mounting member 62 thereby serving to prevent the leakage of oil from the recesses 94 and 96.

As can be seen in FIG. 1, a ball check relief valve 104 communicates between the duct 88 and the chamber 66. The check valve 104 includes a ball 106 which is urged onto a seat 108 by means of a spring 110. When the pressure within the duct 88 exceeds a predetermined level, the ball 106 will be unseated from the seat 108 thereby allowing the escape of fluid from the duct 88 into the storage reservoir 66.

As can be seen in FIG. 1, a manually operable coupling valve member such as a rod 112 is slidably mounted within the housing 9 and projects out of side wall 14 through an opening 114. The inward portion of the rod 112 projects through an opening 116 within the mounting plate 62 and extends across the duct 90 thereby obstructing the duct 90 when moved inwardly to the position shown in FIG. 1. An opening 118 extends through the valve member 112 and communicates at 120 with the inward or central portion of duct 90 and recess 94 when the valve member 112 is in the position of FIG. 1. The other end of opening 118 communicates with the chamber 66. A detent 122 is positioned within the mounting plate 62 for releasably locking the valve member 112 in either a first position as shown in FIG. 1 or in a second position wherein the lower end 124 of the valve member 112 is completely withdrawn from the duct 90.

As can be seen in FIGS. 1, 2 and 3, three circumferentially spaced apart dividers 130 extend inwardly from and are rigidly secured to the wall 40 of casing 36. The inward edges of the dividers 130 are positioned in a sliding and sealing relationship with the outward end of the rotor 30. Spiraling outwardly in both clockwise and counterclockwise directions from the inward end of each of dividers 130 are provided axially spaced apart pairs of ramp members 132. Each of the ramp members 132 is co-extensive at its inward end 134 with the inward surface of one of the dividers 130. At the outer end 136 each ramp 132 is co-extensive with the inward surface of the wall 40. Each ramp member 132 and the divider 130 can either be formed integral with the wall 40 or as a separate unit and suitably secured in place upon the inward surface of the wall 40.

The dividers 130 are each provided with a pair of relief valves 138 and 140. The valves 138 and 140 each include a movable valve member 142 which is urged by a resilient member such as a spring 144 onto a valve port 146 formed at the end of a duct 147 which extends through the divider 130. The relief valves of each pair are positioned on opposite sides of each divider 130 and during operation each of the valves 138 and 140 will allow fluid to pass through the divider 130 in one direction only. Thus as seen in FIG. 3, the relief valve 138 will allow hydraulic fluid to pass from the lower side of divider 130 through port 146 and duct 147 to the upper side of the divider 130. The relief valve 140, on the other hand, will allow fluid to pass from the upper side of the divider 130 through port 146 and duct 147 to the lower side of the divider 130.

As can be best seen in FIGS. 1, 2 and 4, the circular groove 96 communicates through a plurality of axially extending bores 149 with the inward end 150 of a plurality of radially extending slots or ducts 152 cut in the center plate 32 of rotor 30. The outward end of each duct 152 communicates with a chamber 154 located between the outer surface of the rotor 30 and the inward surface of the housing 36.

The circular groove 94 communicates through a plurality of axially extending circumferentially spaced apart ducts 156 with one of a plurality of recesses 158, four such ducts and recesses being shown. Within each of recesses 158 is slidably mounted a plunger 160. Each plunger 160 is secured within the recess 158 by means of a resilient member such as a spring 162. Each of springs 162 is secured at its inward end to the wall of the recess 158 and its outward end to the inward end of the plunger 160.

Spaced around the periphery of rotor 30 are a plurality of sealing assemblies 164, four such assemblies being shown. Each of the sealing assemblies 164 includes a radially extending vane 166, the outward end of which is rounded at 168 and during most phases of operation will contact with either the inward edge of the surfaces 132 or the inward surface of the wall 40. Each of the vanes 166 is slidably mounted within a radially positioned slot 170 which extends through each of the plates 28, 32 and 34. The portion of a slot 170 formed in each of the plates 28, 32 and 34 is, of course, positioned in exact alignment.

In one face of each of the vanes 166 is provided a recess 172 within which one end of a control arm 174 is pivotally mounted. Each of the control arms 174 are pivotally mounted upon a pin 176 within a recess or opening 178 in the plate 32. The end of each control arm 174, opposite from the vane 166, is provided with a pad 180 adapted to engage the outward end of the plunger 160 under certain conditions as will be explained hereinbelow.

Each of the sealing assemblies 164 also includes a resilient member such as a spring 182 extending between the outward wall of the opening 170 and the control arm 174 for yieldably biasing the end of the control arm 174 to which the vane 166 is secured toward the center of the rotor. The compression of the spring 182 can be adjusted as required either by tightening or loosening a stop 184 threaded in the plate 32 adjacent the outward end of the springs 182.

Operation

During operation, the input shaft 26 will be driven by suitable drive units (not shown) thereby imparting rotary movement to the rotor 30 and the gears 74 and 76 of the pump 70. With the coupling valve control member 112 moved downwardly to the position shown in FIG. 1, the hydraulic fluid drawn by the pump 70 from the reservoir 66 through duct 86 will pass out of the pump 70 through duct 88, into duct 92 and through the recess 96 into each of the ducts 152 thereby supplying hydraulic fluid under pressure to the chamber 154. The hydraulic fluid within the bore 158 behind each of the plungers 160 will be able to flow outwardly through the ducts 156 into recess 94, duct 90 and through the duct 118 of the valve member 112 into the reservoir 66. Under these conditions the plungers 160 will not be forced against the portion 180 of the control levers 174. When the pressure of the oil discharged by the pump 70 has reached a predetermined maximum limit, the pressure relief valve 104 will discharge oil into the reservoir 66 thereby establishing a predetermined pressure level within the duct 92, slots 152 and in the chambers 154.

At relatively low speeds, such as for example up to about 300 r.p.m., there will be little or no transfer of power through the coupling because the springs 182 will hold each control arm and vane 166 in a retracted position with the end 168 approximately flush with the outward surface of the rotor 30.

As the speed of the rotor 30 is gradually increased, there will be a gradually increased transfer of power between the rotor and the reactor 36 since the increased speed of the rotor will cause the vanes 166 and control arms 174 to move outwardly against the biasing force of the springs 182 thereby causing a pressure build-up within chamber 154 ahead of each of the dividers 130. During this stage of operation, the vanes 166 will not move outwardly a sufficient distance to seat against the inward face of the wall 40. By changing the strength of the springs 182 or by tightening or loosening the members 184, the speed during which this phase of operation will take place can be varied to suit the requirements of the particular application in which the device is used.

As rotational speeds are increased still further, e.g. to 500 r.p.m., the centrifugal force on the vanes 166 and the control arms 174 will be strong enough to hold the vanes 166 firmly against the inside surface of the reactor 36 or against the ramp surfaces 132 depending upon the angular position of a particular vane with respect to the reactor 36. Under these conditions, a substantial pressure will be built up ahead of at least one of the dividers 130 thereby causing an almost complete transfer of power from the rotor 30 to the reactor 36 with enough slippage to provide a smooth acceleration.

With a heavy load applied to output shaft 46 and with the rotor 30 turning in a counterclockwise direction, as seen in FIG. 2, the relief valve 142 of each pair will allow a small amount of fluid to flow through each of the dividers 130 thereby providing enough slippage to assure smooth acceleration.

It will be understood that power can be efficiently transmitted to the reactor 36 only through a vane which is abutting against the inward surface of the wall 40. When the end 168 of a vane 166 begins to ride inwardly on the inward edges of the ramps 132, substantially less power will be transmitted to the reactor 36 through the vane. However, since the apparatus is constructed with a plurality of vanes 166, there will be a continuous transfer of power from the rotor 30 to the reactor 36.

When the load being driven by the coupling has reached a normal running speed, the load will not be sufficient to open the relief valves 142 and there will be a substantially complete coupling between the rotor 30 and the reactor 36 causing them to rotate as a unit. In this way slippage at normal operating speeds is reduced to an insignificant factor. When the driving unit and input shaft are slowed down below the speed of the output shaft, the rotor 30 will rotate in reverse with respect to the reactor 36. Under these conditions the reactor 36 will, in effect, drive the rotor 30 thereby causing the relief valves 138 to open when the reverse torque upon rotor 30 has reached a predetermined value.

When the coupling valve member 112 is moved upwardly, by an operator, the duct 90 will be opened so that hydraulic fluid passing out of the pump 70 through the duct 88 will pass into the groove 94 and from there into each of the ducts 156 thereby forcing each of the plungers 160 outwardly into abutting relationship with the portion 180 of control arm 174. Each of the control arms 174 will, as a result, be pivoted in a clockwise direction, as seen in FIG. 2, about the pivots 176 thereby retracting each of the vanes 166 so that the outward end thereof is flush with the outward surface of the rotor 30. In this way the rotor 30 can be uncoupled from the reactor 36. When the valve member 112 is again moved centrally to the position shown in FIG. 1, the fluid behind each of plungers 160 will be allowed to pass through the duct 90 into the duct 118 of valve member 112 and then into the reservoir 66. The vanes 160 will then be thrown outwardly with the influence of centrifugal force against the inward surface of wall 40. The various passages leading from the slot 156 to the valve member 112 and the opening 118 within the valve member 112 can be reduced sufficiently in diameter so as to meter the flow of oil therethrough thereby assuring smooth engagement between input and output shafts.

While the invention can be employed in a variety of devices, such as drives for hoists, conveyors, material handling and process machines, as well as for power driven tools and farm implements, it is particularly useful in motor vehicles such as automobiles and in this application it is preferably coupled between the engine and a manually operated transmission of a suitable known construction.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hydraulic coupling comprising in combination; a housing, a generally cylindrical rotor rotatably mounted therein, a casing enclosing said rotor and rotatably mounted within said housing, means extending through said housing for imparting rotary movement to said rotor, a means associated with said casing and extending through said housing for transmitting the movement of said casing out of said housing, said casing including an end wall positioned adjacent to one face of said rotor and a generally circular side wall positioned outwardly of the outward surface of said rotor to define a chamber between said rotor and said casing, a wall member positioned within said housing adjacent the other face of said rotor, means rigidly associated with said casing and positioned in tangential sealing relationship with the outward surface of said rotor, at least two circumferentially spaced apart sealing vanes mounted for radial movement upon said rotor and adapted to rotate with said rotor, the outward edge of each of said vanes being movable between a first position wherein the outward edge thereof is adapted to contact the inward edge of said side wall of said casing and a second position wherein the outward edge thereof is positioned adjacent the outward edge of said rotor, means biasing said vanes toward said second position, a pump means within said housing for supplying fluid under pressure, a fluid pressure responsive means within said rotor operatively connected to move each said vane between said first position and said second position, a duct within said rotor and communicating between said pump means and said fluid pressure responsive means and a selectively operable valve within said duct for controlling the flow of fluid from said pump means to said fluid pressure responsive means.

2. The apparatus according to claim 1 wherein a duct means including bilateral relief valve means is provided within said casing to communicate between the parts of said chamber on opposite sides of said duct means.

3. A hydraulic coupling comprising in combination; a housing, a cylindrical rotor rotatably mounted therein, a casing enclosing said rotor and rotatably mounted within said housing, a first shaft extending through said housing and rigidly connected to said rotor, a second shaft connected to said casing and extending through said housing, said casing including an end wall positioned adjacent to one face of said rotor and a generally circular side wall positioned outwardly of the outward edge of said rotor to define a chamber between said rotor and said casing, a wall member positioned within said housing adjacent the other face of said rotor, at least one member rigidly associated with said casing and projecting inwardly from the inward surface of said circular side wall into tangential sealing relationship with the outward edge of said rotor, relief valve means, operable in response to a predetermined pressure drop thereacross, communicating through said member and between the portions of said chamber on opposite sides of said member, at least two circumferentially spaced apart vane members slidably mounted upon said rotor for movement with respect to said rotor, the outward edge of each of said vanes being movable between a first position wherein the outward edge thereof is adapted to contact the inward edge of the side wall of said casing and a second position wherein the outward edge of said vane is positioned adjacent the outward edge of said rotor, pump means within said housing for supplying fluid under pressure, at least two plungers slidably mounted within said rotor and at least one operatively connected to each said vane for moving each said vane from said first position to said second position, a duct within said rotor communicating with said pump for transmitting fluid therefrom to each said plunger and a selectively operable valve means within said duct for controlling the flow of fluid from said pump to each said plunger.

4. An hydraulic coupling comprising in combination; a rotor, said rotor having a plurality of circumferentially spaced apart radially movable vanes disposed on the periphery thereof, said vanes being normally biased to a retracted position within said rotor and movable to a radially extended position upon rotational speed of said rotor above a predetermined value, a casing surrounding said rotor, said casing having an endwall adjacent one face of said rotor and a sidewall spaced radially from the outward edge of said rotor to define a fluid reaction chamber intermediate the outward edge of said rotor and the sidewall of said casing, a wall member positioned adjacent the other face of said rotor, divider means affixed to said casing and projecting radially inwardly from said sidewall and having an inward edge positioned in sealing relationship with the peripheral surface of said rotor, ramp means rigidly connected to said casing adjacent said divider for directing each of said vanes radially inward to allow said vanes to slide over said divider when said rotor is operative above a predetermined speed, said vanes being adapted to impart motion to a fluid within said chamber.

5. The apparatus of claim 4 in which the means normally biasing the vanes to a retracted position is adjustable.

6. The apparatus of claim 4 in which the means biasing the vanes to a retracted position includes a pivotally mounted lever and a spring.

7. The apparatus of claim 4 in which the ramp means includes a bilateral pressure relief valve operable in response to fluid pressure within the chamber above a predetermined value for providing fluid communication through the ramp means.

8. The apparatus of claim 6 in which fluid pressure responsive means are operatively associated with the lever means for maintaining the vanes in a retracted position within the rotor.

References Cited by the Examiner
UNITED STATES PATENTS

| | | | |
|---|---|---|---|
| 887,781 | 5/08 | Fischer | 192—58 |
| 3,042,163 | 7/62 | Lapsley | 192—58 |

DAVID J. WILLIAMOWSKY, *Primary Examiner.*